INVENTORS
MARVIN GOLDMAN
RUTH P. ANDERSON
BY
ATTORNEY

United States Patent Office 3,375,369
Patented Mar. 26, 1968

3,375,369
MATRIX CORRECTED X-RAY FLUOROMETRIC ANALYSIS METHOD
Marvin Goldman and Ruth P. Anderson, Davis, Calif., assignors to the United States of America as represented by the United States Atomic Energy Commission
Filed July 13, 1965, Ser. No. 471,777
10 Claims. (Cl. 250—51.5)

ABSTRACT OF THE DISCLOSURE

X-ray fluorometric analysis of elemental materials present in a matrix of unknown composition as incorporated with low Z binders into a specimen form of predetermined size and weight. Monochromatic X-rays characteristic of the element to be determined and of known intensity $I_0$, are passed through the specimen form and the intensity, $I$, of the emergent X-rays is determined, wherefrom the ratio of $I/I_0 = T$, the transmittance factor of the specimen is determined. Subsequent irradiation with polychromatic X-rays is then employed to ascertain the net characteristic monochromatic fluorescent X-ray output, $S$, of the unknown amount of said element in the specimen. The amount of said element is then determined using the newly discovered linear relationship between transmittance and sensitivity factors, e.g., by using calibration plots of said factors obtained from known composition specimens or by the use of corresponding simple linear equations.

---

The present invention relates, in general, to quantitative analysis of particular elements by X-ray fluorescence and, more particularly, to a method employing X-ray fluorescence, in which there is provided a direct matrix transmittance correction, for the quantitative determination of particular elements in materials of whatever nature and to apparatus especially adapted thereto.

X-ray fluorescence spectrometry has been used for the quantitative determination of strontium as described, e.g., by W. M. B. Roberts, Nature—183,887 (1959). The X-ray fluorescence methods used heretofore, similarly to those used in neutron activation analysis, flame spectrophotometry (with or without enrichment by a cation exchange) and atomic absorption spectrometry, yield reliable results provided that due precautions and certain stringent conditions are observed. The foregoing methods all require tedious and time-consuming standardization of technique, and the use of reference samples of similar composition and physical state to the sample under investigation. Matrix interferences add to the difficulties of quantitation and occasionally and unpredictably hinder accuracy, sensitivity and precision. Compensation for the effects of interelement absorption and/or enhancement within the matrix has been attempted by resort to the addition of internal standards, or chemical purification and dilution, etc.

The present invention, as exemplified by the quantitative determination of the strontium, iron and zinc, provides a rapid method for determining concentrations of elements, for example, in biological materials such as food, bone in minerals, etc. The method provides the significant advantage of a direct correction for the influence of the matrix of each specimen, per se.

Biological materials due to the complex composition thereof, are representative of a wide variety of matrices. The presence of strontium therein is representative of an element of intermediate atomic number within a matrix of relatively low effective atomic number. Thus X-ray absorption will increase in proportion to increasing strontium concentrations. (Mitchell, B. J., "Encyclopedia of Spectroscopy," G. L. Clark, ed., p. 736, Reinhold, New York, 1960.) The degree of internal absorption is related to the mass absorption coefficients of each of the elements within the matrix. (Compton, A. H., Allison, S. K., "X-rays in Theory and Experiment," p. 513, Van Nostrand, New York, 1935.)

When the elemental composition of the matrix is known, the mass absorption coefficients of the matrix may be calculated from the sum of the coefficients, weighted for the concentration of each element present in the sample. This procedure is time-consuming and is applicable only to matrices of known composition. In attempts to overcome this difficulty, mass absorption coefficients have in the past been estimated, indirectly, e.g., in minerals, by measuring the transmittance of a monochromatic beam of X-rays by the sample under investigation; however, the monochromatic X-rays used were not of those characteristic of the fluorescent X-ray output of the element being analyzed. (Salmon, M. L., "Advances in X-ray Analysis," W. M. Mueller, ed., vol. 2, p. 303, Plenum Press, New York, 1960.)

In accordance with the present invention a monochromatic beam of X-rays at a wave length characteristic of the fluorescent X-ray output of the element being analyzed is utilized to determine the transmittance of a standard sample of selected weight and area. By employing such a wave length, there is achieved a simplified and inherently accurate practical solution to the problem of determining the effect, of the matrix, which matrix can be of complex and unknown composition. Therefore by providing for the quantitation (i.e., determination) of inter-element absorption and enhancement effects of the matrix at the wave length of the emergent line used to make the element content determination. X-ray fluorimetric analysis for the determination of elemental contents is made much more reliable and the effort required is greatly reduced. Moreover, with such a method automation of the procedure may be facilitated.

Accordingly, it is an object of the present invention to provide an improved method for the quantitative analysis of elemental content in materials comprising a complex mixture of elements in either compound, elemental or any composite matrix form by X-ray fluorescense.

Another object of the invention is to provide a method for the quantitative analysis of particular elements in compositions of whatever matrix nature or composition by X-ray fluorimetry in which a direct correction for matrix effects is provided.

Still another object of the invention is to provide an X-ray fluorimetric method for the quantitative determination of selected elements in materials of whatever matrix nature or composition in which monochromatic X-rays of a frequency or wave length characteristic of the element is employed to determine both the transmittance and sensitivity characteristics of standardized sample forms to provide an index suitable for compensating for matrix effects to give more accurate and simplified determination.

A further object of the invention is to provide X-ray fluorimetric analysis apparatus especially adapted for the simplified quantitative determination of the content of selected elements in materials of complex matrix nature and compositions.

Other objects and advantages of the invention will be apparent in the following description taken together with the accompanying drawing of which.

In operating the process of the invention there is generally used a sample or specimen of standardized size and weight to provide a selected mass per unit area usually containing the material to be analyzed in finely-divided form uniformly distributed in binder or otherwise as a mechanically stable wafer-like compact or briquet of disk shape suitable for disposition in a sample holder. The binder or other means retaining the material is selected to be devoid of the element being analyzed and generally to be of low effective Z. Standard source forms containing requisite amounts of said element are also prepared to permit production of the necessary monochromatic characteristic X-ray beam, e.g., the K$\alpha$ wave length or other appropriate wave length, used in the determination.

The prepared sample form is then disposed in a collimated monochromatic bear of X-rays of the characteristic fluorescent wave length of the element being analyzed having a known or standard intensity, $I_0$. The intensity, $I$, of the transmitted beam is also measured as the time required for a selected number of counts to accumulate with the number of counts being selected to be sufficiently high to assure good counting statistics, e.g., above about 1,000,000 counts. The intensity values for both $I_0$ and $I$ are reduced to counts per second and the ratio of $I/I_0=T$, the transmittance factor of the sample. Thenceforth, the sample is positioned in a beam of polychromatic X-rays, as in conventional X-ray fluorimetric spectrometry and the net characteristic monochromatic fluorescent X-ray intensity, i.e., sensitivity, S, output is determined. In the event that the background continuum is possibly variable at the X-ray energy under consideration, measurements of the intensity at points 1 or 2 degrees to either side of the $2\theta$ Bragg angle, as described below, is made and an interpolated proportion of the difference in count rate is added to the lower energy count to determine the background effect of varying quantities of other material in samples. The background count is then subtracted from the total characteristic fluorescent X-ray intensity to yield the sensitivity, S, of the unknown sample. Varying the concentration of the analyzed element in a standard sample does not appear to influence sensitivity (c.p.s. mg.) at equal transmittance ($I/I_0$) levels which circumstance provides the important advantage that little knowledge of the composition of the sample is necessary. The effects of extraneous materials are inherently compensated in this procedure.

A plot of the matrix related factors, i.e., transmittance vs. sensitivity demonstrates a linear relationship which plot is, in fact, a calibration graph for any similar standard size sample which is not totally opaque, i.e. ($I/I_0>0$). Hence, either calibration graphs or simple linear equations can be used to translate the value of the ratio of transmittance to fluorescent sensitivity into the content of the analyzed element in each standard size sample. Knowing the weight of material used in the sample form the percentage composition is easily computed.

It is considered that the fluorimetric analysis of the invention is, in theory, applicable to the analysis of any particular element with the exception of hydrogen and, practically, for any element having an X-ray fluorescent wave length of sufficient energy to be transmitted in air. With usual equipment this limit is above about 10 kiloelectron volts and below about 150 kiloelectron volts. The method is certainly applicable to analysis of elements ranging from about lithium to the actinide elements of the Periodic System for which, at least 70 in number, conventional X-ray fluorimetric methods have heretofore been employed. Methods applied to analysis of strontium, iron and zinc in biological samples representative of elements emitting from quite soft to hard X-ray fluorescence are disclosed hereinafter. The nature of the matrix material analyzed may vary widely and standard sample size may be varied to accommodate for opacity effects as long as calibration curves or calculation constants related to a similar size, i.e., mass/area, calibration reference is used.

Moreover, the identical sample briquet can be used, with substitution of sources containing other selected elements and with adjustment to accommodate for the different monochromatic characteristic X-rays thereof, sequentially, for analyzing other elements therein. This is particularly true in the case of trace elements found in biological, mineral and other complex mixtures of low to medium Z-number.

The sample form is generally a circular wafer or disk of up to several centimeters in diameter, of an area large enough to intersect the monochromatic X-ray beam and of several grams in weight. For example, with a disk of 3 centimeter diameter, a total weight of about 0.5 to 5 grams will generally suffice. Smaller amounts and lower sample concentrations are used where X-ray wave length is long (energy is low) to offset attenuation. With higher energy X-rays larger sample weights and concentrations can be used with attendant speed up in determination. It is generally preferred to incorporate selected proportions of the material to be analyzed homogeneously in a finely-divided (below 200 mesh) form with a selected binder, preferably of low-Z and devoid of the element to be analyzed in amounts sufficient to provide the standard sized sample. Conventional procedures are used to convert the mixture into a rigid or semi-rigid condition which can be handled and positioned in sample holder or the equivalent. Compaction by high pressure to form briquette or solid compact forms in a standard size molding die is satisfactory and convenient. The amount of element therein is not critical and need merely be sufficient to assure an adequate X-ray output. Characteristic fluorescent X-rays for use in making the transmittance determination of the invention may be generated by bombarding a rigid source containing the element to be analyzed with polychromatic X-rays of higher energy. For convenience, using apparatus discussed hereinafter, a molded form of similar configuration to the sample form may be used for such source and conventional X-ray fluorometers modified with proper sample holders can be used to select and direct the monochromatic X-ray beam through the sample for determining transmittance.

The low Z-binder may be any sample organic material which does not contain significant amounts of heavy elements or the element being analyzed. Wax, resins, sugars, low Z-metallic soaps, starch, dextrin, methyl and ethoxycellulose, polyvinyl alcohol, detergents, thermoplastic resins, thermosetting resins with catalyst, and the like organic compounds having the properties of providing admixtures which are compactable or which set to form rigid and semi-rigid forms are suitable. Ordinarily, the elements, e.g., C, H, O, etc., present in such materials are more easily determined by other means so that dilution therewith does not complicate the analysis by requiring compensation therefor.

Figure 1:
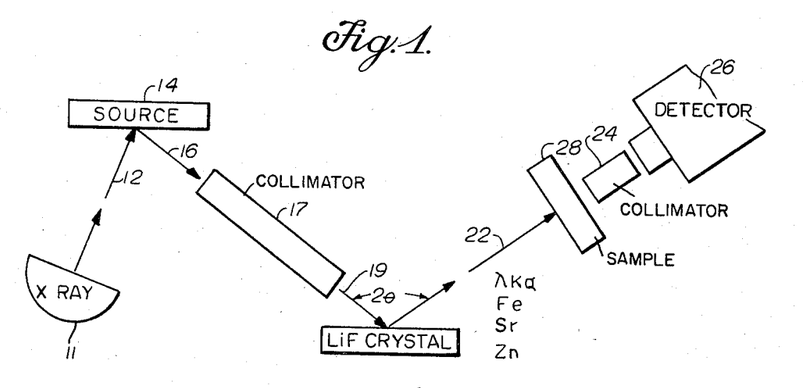
FIGURE 1 is a schematic illustration of X-ray fluorimetric apparatus as arranged with a source of monochromatic X-rays and a sample arranged in position for determining the transmittance factor of the sample.

Apparatus suitable for use in operating the process may generally include the combination of means illustrated, schematically, in FIGURE 1 of the drawing, wherein source 11 provides a beam 12 of polychromatic X-rays having an energy in the range of about 10 to about 150 kilovolts and of sufficient intensity to provide an adequate excitation of fluorescense at the selected characteristic wave length. For convenience in avoiding the necessity of recalibration, adjustments are generally made to maintain constant energy input and output intensity levels. Means (not shown) is provided to support a source 14, constructed as above, containing a quantity of the element being analyzed. In practice the holder means may take the form of a slotted frame into which the sample disk or briquette is slipped. However, a simple means such as a plastic bag or envelope container or suitable size may conveniently be suspended from a support (not shown) and used to enclose and position said source 14. Impingement of X-ray beam 12 on source 14 excites the emission of a beam 16 of X-rays including a characteristic fluorescent X-ray wave length of said element being analyzed. The emergent X-ray beam 16 is directed through an entrance conventional X-ray collimator 17 to provide a collimated beam 19 including X-rays of said fluorescent wave length.

The desired component of beam 19 is separated therefrom by suitable means such as a crystal analyzer 21, e.g., a lithium fluoride or other crystal rotatably mounted and disposed with appropriate crystal planes in angular relation to said beam whereby the desired component is reflected or diffracted and emerges as a divergent beam spectrum of X-ray wave lengths. The spectrum is distributed to either side of the desired component beam 22 which emerges at the 2θ Bragg angle, said angle taken with respect to beam 19. For convenience the crystal analyzer may be positioned on the pivotal axis of the goniometer system of a typical X-ray spectrometer (not shown) as in usual practice. The desired wave length component beam is selected from the aforesaid divergent beam spectrum by means of an X-ray collimator 25 of conventional design positioned to or mounted at the 2θ Bragg angle characteristic for the wave length of the desired monochromatic fluorescent X-ray wave length. The beam 22 is then directed to a suitable X-ray detector 26, such as a scintillation detector, ionization chamber, Geiger counter, proportional counter, or the like by which X-ray intensities may be determined. For convenience, in selecting the desired component beam 22 the collimator 24 and detector 26 may be mounted on a goniometer mechanism (not shown) of a typical X-ray spectrometer which provides for the correlated rotation of crystal analyzer and a mechanically doubled angular rotation of the detector 26 and collimator 24 to permit rapid and accurate adjustment to the 2θ Bragg angle or other angle, e.g., background side angle as may be desired.

Again as an important feature of the invention a sample holder (not shown) is provided to position a sample 28 to transversely intersect the path of beam 22, preferably, immediately before collimator 24 is an operation employed to determine the transmittance factor I, of the sample as described above. It will be apparent that X-ray fluorometric equipment of conventional design can be modified to provide the foregoing structure or the equivalent.

Figure 2:
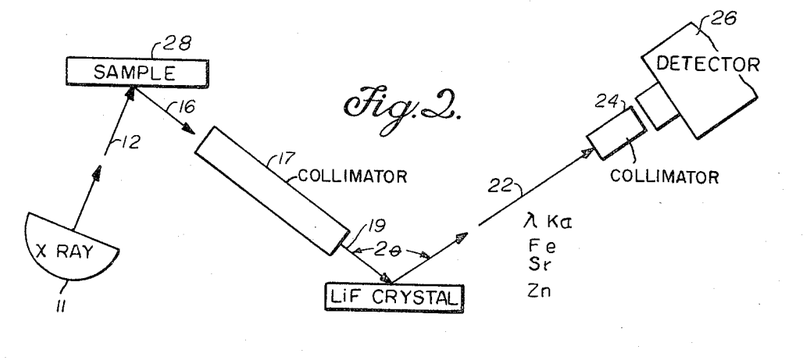
FIGURE 2 is a schematic illustration of X-ray apparatus with the sample of FIGURE 1 arranged in a conventional manner to determine the sensitivity factor of the sample.

For determining the origial intensity, $I_0$, sample 28 is merely removed from said holder. The conventional determination of the net fluorescence intensity, S, of the sample is conducted in the identical apparatus of FIGURE 1 with sample 28 now substituted for the source 14 as shown in FIGURE 2.

In summary, X-ray theory predicts that fluorescence is directly proportional to elemental concentration in a sample. Experimentally, one finds that deviations from proportionality are the result of (1) absorption effects on primary and fluorescent radiation, (2) scattering influences on fluorescence intensity determinations and (3) enhancement due to interelement effects.

Enhancement is usually due to the presence of a second element in the sample in sufficient quantity such that its characteristic radiation causes fluorescence of the element of concern within the sample (Liebhafsky et al., 1960). In low atomic number matrices, such as are usually encountered in biologic specimens, this situation is uncommon. However, absorption and scattering are of primary concern in determining relatively long wavelengths from low Z matrices.

Most biologic materials are composed primarily of elements whose atomic number is below 20. In this case, the discussion of Kalman and Heller (1962) relating fluorescent intensity to scattering in light matrices is applicable. They found that fluorescent intensity, $I_t$, and concentration, $Cy$, were related as:

(1)
$$I_t = \frac{Cy}{\mu\lambda + \mu\lambda_0} k$$

$k$ is a constant for any element $y$ in concentration $Cy$
$\mu y\lambda$ is the mass absorption coefficient of the sample $y$ at wavelength $\lambda$
$\lambda_1$ is shortest wavelength contributing to exciting beam
$\lambda_c$ is the critical absorption wavelength for element $y$
$\lambda_0$ is the wavelength of fluorescent radiation and $=k'\lambda$
$\lambda_1 \leq \lambda \leq \lambda_c$ (assuming no critical absorption edges between $\lambda$ and $\lambda_c$).

Thus it is seen that the concentration-fluorescent intensity proportionality is influenced by the mass absorption coefficient (matrix) and the wavelength (element).

The quantitation of fluorescent intensity thus depends upon determining the value for $\mu\lambda_0$, the influence of the matrix on attenuation. However, the sample $\lambda_0$, transmittance and mass absorption coefficient are related by:

(2)
$$\text{Transmittance} \left(\frac{I}{I_0}\right) = e^{-\mu\lambda_0 \rho x}$$

where:

$x$ is sample thickness
$\rho$ is sample density
$I/I_0$ is the ratio of transmitted to incident fluorescent intensities at wavelength $\lambda_0$ and $\mu\lambda_0$ is the appropriate mass absorption coefficient.

Thus, when sample thickness and density are known, a measure of transmittance provides an index of the mass absorption coefficient.

The relation between transmittance and sensitivity (in terms of fluorescent yield per unit concentration of element $y$ in a sample), are derived using standards containing known concentrations of $y$. These data are then applied to unknown samples and quantitation of $y$ calculated from the ratio of fluorescent intensity from $y$ divided by fluorescent sensitivity, S, at equal transmittance.

Gross fluorescent intensity always includes a significant contribution from internal scattered radiation, particularly in light matrices, so that net fluorescent intensity determinations are dependent upon the accuracy of background scattering measurements. As noted by Compton and Allison (1935), both scattering and the mass absorption coefficient at a particular wavelength are related to the effective atomic number of the sample. Thus, an estimate of the mass absorption coefficient for samples of comparable effective Z (as is often seen in biologic materials), can assist in determining the scattering where direct background measurements are impractical. This occurs when interference peaks lie adjacent to the fluorescent peak under consideration.

If the sample and the spectral energy of the exciting X-ray beam are kept constant, an integrated mass absorption coefficient for any matrix not infinitely thick may be established for the selected set of conditions. Therefore $$(3) \quad I/I_0 = e^{-\mu x} = e^{-\frac{\mu}{\rho} m}$$

where $I_0$ is the incident X-ray beam intensity, I is the transmitted X-ray beam intensity, $\mu/\rho$ is the mass absorption coefficient in sq. cm. per gram and $m$ is the mass of the sample in grams per sq. cm. For strontium, transmittance of the $K\alpha$ wavelength of 0.875 A. (14.1 k.e.v.), has provided a practical measure of the mass absorption coefficient, permitting interelement absorption corrections to be calculated without further knowledge of the elemental composition of biological samples.

Excitation of fluorescent radiation by the incident beam in briquets of varying density follows Beer's law when an effective wavelength is used to describe the polychromatic X-rays which interact with the briquet. Therefore, in a given specimen, a total absorption coefficient, the sum of the incident polychromatic beam and subsequent fluorescent coefficients influences fluorescent intensity and, hence, sensitivity. The ratio of the total absorption coefficient and the fluorescent absorption coefficient in a sense characterizes the specimen.

If both monochromatic X-ray transmittance ($I/I_0$) and sensitivity (c.p.s./$\mu$g.) are independently measured in the same specimen, the relation of the two measurements is proportional to their absorption coefficients. In the case of the sensitivity factor, the matrix effect on the ability of the polychromatic incident beam to excite fluorescence and for the fluorescence to be quantitated by measuring its intensity, are both included in the measurement. It has been determined that a proportionality exists between transmittance and sensitivity, if the sole variable is the elemental composition of specimens of equal grams per sq. cm.; since the exponential terms in both absorption coefficient expressions cancel out when expressed as ratios.

Other details of the process and apparatus of the invention will be apparent from the following examples:

*Example 1*

A Phillips (Norelco) vacuum X-ray spectrometer was utilized in these determinations and its operational data are summarized in Table I.

TABLE I

| | |
|---|---|
| Counter (voltage) | Scintillation (750 v. DC). |
| X-ray tube target, voltage and current | Tungsten, 50-kv., 45 ma. |
| Analyzing crystal | LiF. |
| X-ray path | Air. |
| Collimators, entrance, exit | 2-inch x 5-mil; 1-inch x 20-mil. |
| Pulse height, baseline | Integral, 3 volts. |
| Sr Bragg angle, $2\theta$ | 25.15°. |
| Sr background angles $2\theta$ | 24.15°, 27.15°. |
| Peak and background measurements | Time to record 1,024,000 counts each. |
| Transmittance measurements, $I/I_0$ | Time to record 128,000 counts each. |

The materials analyzed for strontium include canine bone ash, dried dog food (a kibbled grain compound), food ash, and a Sr standard of argillaceous limestone which was certified by the National Bureau of Standards. The strontium content of the various samples had been subjected to referee evaluation. The X-ray determinations were performed by the method of internal standards. The strontium-containing materials tested were briquetted when necessary with a binder such as a detergent (Tide), soap (Ivory Snow), or powdered sugar. These binders were found to be essentially free of strontium. Several grams of commercial grade plaster of paris were used as a reliable $SrK\alpha$ source in the specimen transmittance evaluations, since it contains about 0.1% Sr impurity.

The strontium-containing materials were ground to at least 200 mesh and dried prior to use (100° C. for 24 hours). Aliquots of each specimen were then thoroughly mixed with varying quantities of binder such that the total weight of each preparation, specimen and binder, was 20,000 grams. The 2-gram mixtures were then compressed into briquets of 31.78 mm. diameter by a steel die in a hydraulic press. The arbitrary choice of a 2-gram briquet ensured adequate mechanical stability. Thus, the mass per unit area for all samples was maintained at 0.253 gram per sq. cm. The use of an organic binder—e.g., sugar—does not interfere with possible subsequent analytical steps such as thermal ashing or dilutions.

The analysis of the specimens was accomplished in two straight-forward steps as illustrated in FIGURES 1 and 2. In the transmittance measurements, the prepared briquet was positioned at right angles to the exit collimator, thus intercepting the 0.875 A. beam reflected by the LiF crystal prior to detection by the scintillation counter. Transmittance was determined with the goniometer fixed on the plaster $SrK\alpha$ Bragg angle as the time to record 128,000 counts with and without a briquet in the beam, as in FIGURE 1. The briquets were suspended in 0.25-mil Mylar envelopes for ease of measurement without prejudice of sensitivity. The specimens were then measured in the conventional manner at the 25.15° $2\theta$ Bragg angle as well as two adjacent background angles at 24.15° and 27.15° $2\theta$ as in FIGURE 2, since the background continuum from light matrices is quite variable at these energies. The diffracting crystal and X-ray tube potential used produced a background response curve which was essentially linear over the energy band from 0.842 A. to 0.945 A. which includes the $SrK\alpha$ characteristic wavelength. Therefore, interpolation between the two "off angles" permitted estimation of the $SrK\alpha$ background. In this case two thirds of the difference in count rate between the two off-angle rates was added to the lower energy (at 27.15° $2\theta$) count rate. The net intensity at 25.15° $2\theta$ was then calculated for each series of briquets and the typical loss in net intensity with increasing concentration of biological material in the binder was demonstrated.

Five series of 2-gram samples were prepared such that the weight percent of binder and Sr-containing specimen was varied but known. The Sr concentration of each specimen was then used to determine the sensitivity factor, in c.p.s./$\mu$g. Sr.

The strontium content of the specimens determined by X-ray fluorescence is compared to referee values in Table II. The samples prepared plus the binders used are shown in Table III. Note that an increase in the fractions of sample bone ash or limestone standard in binder, soap, sugar, detergent, or dry dog food, is accompanied by a corresponding nonlinear decrease in sensitivity and transmittance ($I/I_0$). In addition, Sr concentration ($\mu$g. Sr/2-gram sample) does not appear to influence sensitivity (c.p.s./$\mu$g. Sr) at equal transmittance ($I/I_0$).

TABLE II.—Sr-CONTAINING MATERIALS-INTERMETHOD ANALYSIS MG. Sr/GRAM MATERIAL

| Material | Flame spec- trometry [a] | Neutron | | X-ray fluo- rescence [e] | NBS value |
|---|---|---|---|---|---|
| | | Activation | Analysis | | |
| Dog bone ash: | | | | | |
| A [d] | 0.423 | [b] 0.36 | [c] 0.32 | 0.384 | |
| B | 0.229 | [b] 0.23 | [c] 0.20 | 0.212 | |
| Dried dog food [d] | | | | 0.025 | |
| Limestone 1a [d] | 1.90 | [b] 1.28 | [c] 1.88 | 1.945 | 1.9 |

[a] Average of 2 or more determinations.
[b] Single determination (Laboratory A).
[c] Average of 2 determinations (Laboratory B).
[d] Samples used in present study Table III.
[e] Internal standard method.

TABLE III.—SENSITIVITY AND TRANSMITTANCE OF STRONTIUM-CONTAINING BRIQUETS

| Specimen plus binder in briquet | Binder, gram | Specimen weight, gram | μg. Sr | Transmit- tance, $I/I_0$ | Sensitivity, c.p.s./μg. Sr | Briquet net SrKα | Back- ground, c.p.s. |
|---|---|---|---|---|---|---|---|
| Bone ash plus detergent | 0.200 | 1.800 | 681 | 0.12 | 2.14 | 1,456 | 2,438 |
| | 0.500 | 1.500 | 576 | 0.11 | 2.40 | 1,384 | 2,571 |
| | 1.000 | 1.000 | 384 | 0.15 | 3.01 | 1,154 | 2,934 |
| | 1.500 | 0.500 | 192 | 0.21 | 3.98 | 765 | 3,566 |
| | 1.600 | 0.400 | 154 | 0.24 | 4.24 | 652 | 3,790 |
| | 1.800 | 0.200 | 76.8 | 0.28 | 4.88 | 375 | 4,232 |
| | 1.900 | 0.100 | 38.4 | 0.32 | 5.05 | 194 | 4,482 |
| Bone ash plus sugar | 1.000 | 1.000 | 384 | 0.21 | 3.67 | 1,410 | 3,262 |
| | 1.500 | 0.500 | 192 | 0.39 | 5.89 | 1,131 | 4,653 |
| | 1.600 | 0.400 | 154 | 0.44 | 6.52 | 1,001 | 5,227 |
| | 1.800 | 0.200 | 76.8 | 0.55 | 8.98 | 690 | 6,442 |
| | 1.900 | 0.100 | 38.4 | 0.63 | 10.16 | 390 | 7,780 |
| | 1.950 | 0.050 | 19.2 | 0.68 | 10.21 | 196 | 8,473 |
| Limestone 1a plus sugar | 0.800 | 1.200 | 2,334 | 0.24 | 3.42 | 7,972 | 3,391 |
| | 1.000 | 1.000 | 1,945 | 0.25 | 4.00 | 7,788 | 3,815 |
| | 1.500 | 0.500 | 972.5 | 0.42 | 6.23 | 6,056 | 5,544 |
| | 1.700 | 0.300 | 583.5 | 0.52 | 7.79 | 4,544 | 6,192 |
| | 1.800 | 0.200 | 389.0 | 0.57 | 8.99 | 3,497 | 7,088 |
| | 1.900 | 0.100 | 194.5 | 0.66 | 9.98 | 1,941 | 7,786 |
| | 1.950 | 0.050 | 97.3 | 0.69 | 10.78 | 1,049 | 8,361 |
| Limestone 1a plus dry dog food | 1.800 | 0.200 | 434 | 0.49 | 8.05 | 3,493 | 6,195 |
| | 1.900 | 0.100 | 242 | 0.54 | 8.85 | 2,141 | 6,937 |
| | 1.950 | 0.050 | 146 | 0.57 | 9.26 | 1,352 | 7,246 |
| Limestone 1a plus soap | 1.500 | 0.500 | 972.5 | 0.37 | 5.89 | 5,733 | 5,248 |
| | 1.800 | 0.200 | 389.0 | 0.50 | 8.30 | 3,228 | 6,806 |
| | 1.900 | 0.100 | 194.5 | 0.57 | 9.19 | 1,787 | 7,575 |
| | 1.950 | 0.050 | 97.3 | 0.60 | 9.51 | 925 | 8,105 |

A plot of these two matrix related factors, transmittance vs. sensitivity, provides a linear relationship which in fact is a strontium calibration graph for any 2-gram sample which is not totally X-ray opaque—i.e. $(I/I_0 > 0)$.

Figure 3:
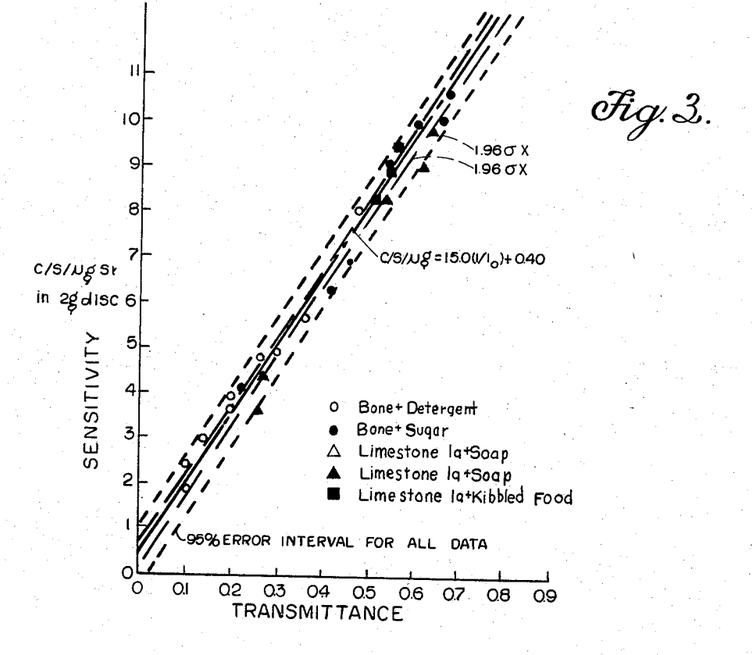
FIGURE 3 is a graphical representation of the relation of strontium sensitivity to transmittance of the data from Table III in Example I.

A linear regression line, fitted to the data from the 27 calibrated specimens in Table III includes the 95% error interval ($2\sigma$) for all the measurements and for any single determination and is shown in FIGURE 3. Thus the relative standard deviation ($\sigma$) for a single determination would be about 5% over the range studied.

Control of the $I_0$ at 7600 c.p.s. by means of occasional minor adjustments of the detector voltage eliminated day to day fluctuations and reproducibility within 2% was achieved. It should be noted that an excessive amount of plaster powder was utilized for the transmittance studies (2 grams) and presented an infinitely thick sample to the primary X-ray beam. For the rate constants and specimen and parameters used, the equation for the line would be (1) $\quad Sr_x = A(I/I_0) + B$ where:

$Sr_x$ = sensitivity (c.p.s./μg.) in briquet
$A = d\, Sr_x/d(I/I_0)$
$I/I_0$ = transmittance of briquet $x$
$B$ = sensitivity (c.p.s./μg.) when $I/I_0 = 0$; ordinate intercept.

When the data in Table II were fitted to the above equation for a straight line using the $I_0 = 7600$ c.p.s., solution of the equation yielded values of $A = 15.0$ and $B = 0.40$. Thus the strontium sensitivity in a 2-gram briquet sufficiently dense to be opaque to the 14.1-k.e.v. strontium line would, under these instrumental conditions, be expected to have a sensitivity of only 0.40 c.p.s./μg. Under the experimental conditions described above, substitution of the factors determined by the linear regression fit to the data into Equation 1 results in Equation 2

(2) $\quad Sr_x = 15.0(I/I_0) + 0.40$

To determine the unknown μg. Sr/-gram in 2 gram briquets, the sensitivity Equation (2), specimen weight, and net fluorescent intensity are utilized. Rearrangement of these values to solve for strontium concentrations in terms of micrograms of strontium per gram of specimen, where the briquets are maintained at total weight of 2 grams, results in the following Equation 3;

(3)

$$\mu g.\ Sr/gram = \frac{\text{net c.p.s. in 2-gram briquet}}{[15.0\ (I/I_0) + 0.40] \times \text{gram specimen used in briquet}}$$

Because of the relatively simple composition of most biologic materials as compared, for example, to geologic specimens, it is probable that multiple trace element determinations can be performed on the same sample, provided the characteristic wavelengths used for transmittance measurements are of sufficient energy to traverse the sample. It is possible that preparations of lyophilized materials and filtered precipitates can be treated in a similar fashion with the increased advantage of concentration.

*Example II*

Iron and zinc determinations were made as follow. For long wavelengths samples are prepared of minimal and consistent thickness consonant with mechanical stability, using a binder with a low effective Z. A practical solution involves use of 31.78 mm. diameter briquets with a total sample weight of 1 gram, using soap (Ivory Snow) as an organic binder of low effective atomic number.

The biologic specimens were prepared by thermal ashing at 500° C., manual grinding to at least 200 mesh, careful mixing with a weighed amount of binder (soap) to a total weight of 1.000 g., and compression at 5 tons in a steel die, to produce briquets of uniform quality each containing 0.126 gram per sq. cm., regardless of the fractional specimen weight.

A set of iron-containing samples was prepared ranging from 90 to 3500 $\mu$g./g. by varying the weight percent of added limestone in 1 g. soapbinder briquets. The limestone 1a was certified by the N.B.S. to contain 1.63% $Fe_2O_3$. Matrix scattering at the FeK$\alpha$ wavelength was estimated using soap briquets containing magnesium oxide or a mixture of cadmium oxide and zinc acetate. These additions permitted transmittance and scattering measurements over a range of effective atomic numbers.

The source for K$\alpha$ radiation (6.4 kev. kilo-electron volts) was a steel planchet.

A dilute source of zinc was prepared by carefully mixing zinc acetate with cadmium oxide (or the limestone 1a). Weighed portions of these mixtures were then carefully mixed with soap to produce a set of zinc standards from 133 to 3580 $\mu$g./g. Matrix scattering at the ZnK$\alpha$ wavelength was derived using zinc-free plaster of Paris to alter transmittance. A zinc acetate-soap source was prepared as a source of zinc K$\alpha$ radiation (8.6 kev.).

The procedure followed was identical to that described earlier for strontium.

Gross fluorescence intensity was measured with the unknown sample in the conventional geometery as in FIGURE 2. Net fluoroscence was then computed by interpolation from appropriate "oc angle" measurements for background correction for iron, and for zinc extrapolation from establshed transmittance-scattering relations as described below. The instrumental settings used in these determinations are summarized in Table IV.

TABLE IV.—INSTRUMENTAL SETTINGS

| Counter | Scintillation |
|---|---|
| X-ray tube target | Chromium. |
| Analyzing crystal | LiF. |
| X-ray path | Air. |
| Collimator, entrance | 2" x 5 Mil. |
| Collimator, exit | 1" x 20 Mil. |

| Element, radiation | ZnK$\alpha$ | FeK$\alpha$ |
|---|---|---|
| Counter voltage | 700 VDC | 740 VDC. |
| Target tube voltage | 50 KV | 50 KV. |
| Target tube current | 30 MA | 30 MA. |
| Pulse height | Differential | Differential. |
| Baseline voltage | 6.6 volts | 7.2 volts. |
| Window voltage | 18 volts | 17.4 volts. |
| Amplifier gain | 25 | 25. |
| Bragg angle, 2$\vartheta$ | 41.70° | 57.46°. |
| Background angles, 2$\vartheta$ | None | 56.32°, 58.60°. |
| Method of counting | Fixed counts | Fixed counts. |

TABLE V.—IRON K$\alpha$ SCATTERING AND TRANSMITTANCE BY NON-FERROUS SOAP BRIQUETS CdO-ZnO ACETATE

| | Specimen in 1000 g. Soap Briquet (mg.) | FeK$\alpha$ (6.4 Kev.) scattering (c./s.) | Transmittance at 6.4 Kev. (I/I$_0$) |
|---|---|---|---|
| | 22.4 | 125 | 0.044 |
| | 43.9 | 104 | 0.022 |
| | 51.0 | 102 | 0.015 |
| | 72.0 | 92 | 0.009 |
| | 100.2 | 89 | 0.003 |
| | 127.5 | 82 | 0.001 |
| MgO | 0.0 | 135 | 0.083 |
| | 54.6 | 130 | 0.070 |
| | 100.7 | 125 | 0.059 |
| | 150.0 | 123 | 0.053 |
| | 199.9 | 118 | 0.041 |
| | 301.8 | 115 | 0.027 |

Figure 5:
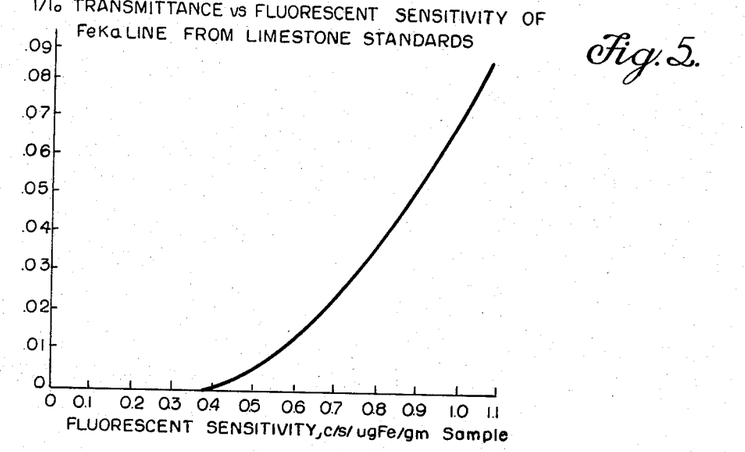
FIGURE 5 is a calibration graph of transmittance vs. fluorescent sensitivity for FeK$\alpha$ X-rays derived from N.B.S. (Nat. Bur. Stand.) limestone standards.

The standardization using limestone is summarized in Table VI and demonstrates the relation between intensity, transmittance, sensitivity and concentration. The calibration graph of sensitivity vs. transmittance is shown in FIGURE 5.

TABLE VI.—IRON STANDARDIZATION USING N.B.S. LIMESTONE 1a

| Mg. limestone in 1.000 soap briquet | Measured Fe Conc. $\mu$g. Fe/g. briquet | Net Fluorescence, c./s. | Sensitivity/ briquet, c./s./$\mu$g. Fe. | Transmittance, I/I$_0$ |
|---|---|---|---|---|
| 0 | 0 | 32 | ---- | ---- |
| 8.1 | 92 | 101 | 1.098 | 0.0803 |
| 10.4 | 118 | 128 | 1.085 | 0.0794 |
| 19.7 | 224 | 245 | 1.094 | 0.0726 |
| 50.1 | 571 | 540 | 0.946 | 0.0543 |
| 77.3 | 881 | 775 | 0.870 | 0.0383 |
| 100.2 | 1,144 | 917 | 0.803 | 0.0302 |
| 125.5 | 1,431 | 1,030 | 0.702 | 0.0222 |
| 200.0 | 2,280 | 1,420 | 0.623 | 0.0102 |
| 300.1 | 3,418 | 1,732 | 0.507 | 0.0035 |

The biologic specimens were measured in the same manner as the standards and the pertinent data is summarized in Table VII.

TABLE VII.—IRON CONTENT OF BIOLOGIC SPECIMENS

| Specimen | Specimen wt. in 1 g. briquet (mg.) | Net Fluorescence, c./s. | Transmittance I/I$_0$ | Sensitivity c./s./$\mu$g. Fe/ briq. | Fe Conc. $\mu$g. Fe/g. spec. |
|---|---|---|---|---|---|
| Dog hair ash | 500.6 | 1,330 | 0.0004 | 0.325 | 8,174 |
| | 400.1 | 1,229 | 0.0009 | 0.380 | 8,082 |
| Kibble food ash | 300.4 | 693 | 0.0029 | 0.500 | 4,614 |
| | 100.1 | 362 | 0.0295 | 0.810 | 4,465 |
| Esbilac [1] (milk) ash | 500.3 | 79 | 0.0002 | 0.325 | 486 |
| | 299.9 | 67 | 0.0012 | 0.440 | 508 |

[1] Borden Company.

Figure 6:
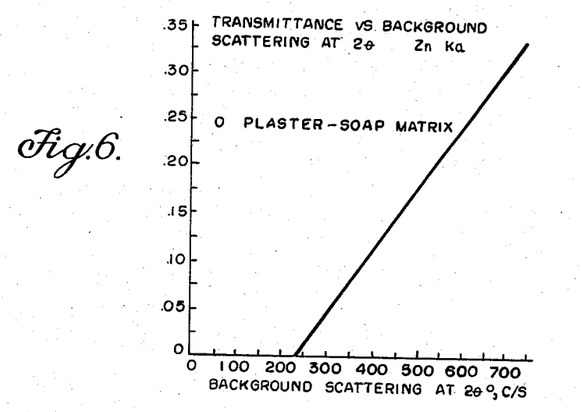
FIGURE 6 is a graphical representation of transmittance $I/I_0$ and background scattering of the ZnK$\alpha$ wave length in (N.B.S. limestone 1a)

Scattering from zinc containing specimens was estimated by correlation with the appropriate transmittance value compared with that derived from a set of zinc-free plaster of Paris-in-soap briquets as in FIGURE 6. The fluorescent sensitivity, transmittance, and intensity relationship of zinc-containing standards is shown in Table VIII from which transmittance-sensitivity graph FIGURE 7 was drawn.

TABLE VIII.—ZINC SENSITIVITY-TRANSMITTANCE IN STANDARD SAMPLES

| Specimen Standard | Mg. Std. in briquet | Zn $\mu$g./ briq. | Net fluorescence, c./s. | Sensitivity/ c./s./$\mu$g./ briq | Transmittance, I/I$_0$ |
|---|---|---|---|---|---|
| CdO-ZnOAc [1] | 22.4 | 133 | 534 | 4.015 | 0.232 |
| | 43.9 | 262 | 828 | 3.160 | 0.163 |
| | 51.0 | 304 | 836 | 2.750 | 0.144 |
| | 72.0 | 429 | 1,208 | 2.815 | 0.107 |
| | 100.2 | 597 | 1,140 | 1.909 | 0.069 |
| | 127.5 | 760 | 1,369 | 1.800 | 0.046 |
| | 137.3 | 818 | 1,347 | 1.637 | 0.040 |
| | 154.2 | 919 | 1,435 | 1.561 | 0.031 |
| | 201.1 | 1,198 | 1,369 | 1.143 | 0.018 |
| | 299.8 | 1,787 | 1,456 | 0.815 | 0.008 |
| LS 1a-ZnOAc [2] | 15.7 | 139 | 603 | 4.34 | 0.307 |
| | 24.9 | 222 | 907 | 4.09 | 0.292 |
| | 77.3 | 691 | 2,350 | 3.40 | 0.221 |
| | 82.1 | 735 | 2,506 | 3.41 | 0.211 |
| | 107.8 | 963 | 2,960 | 3.05 | 0.194 |
| | 150.0 | 1,340 | 4,113 | 3.07 | 0.166 |
| | 199.6 | 1,783 | 5,158 | 2.89 | 0.122 |
| | 250.1 | 2,235 | 5,083 | 2.27 | 0.100 |
| | 298.9 | 2,671 | 5,921 | 2.22 | 0.077 |
| | 349.8 | 3,125 | 5,973 | 1.91 | 0.063 |
| | 400.7 | 3,580 | 6,525 | 1.82 | 0.051 |

[1] CdO-Zn-OAc=0.2001 g. Zinc acetate mixed in 9.7995 g. CdO=5,959 $\mu$g. Zn/g. mix.
[2] LS 1a-ZnOAc=0.3000 g. Zinc acetate mixed in 9.6993g. Limestone 1a=8,935 $\mu$g. Zn/g. mix.

Figure 4:
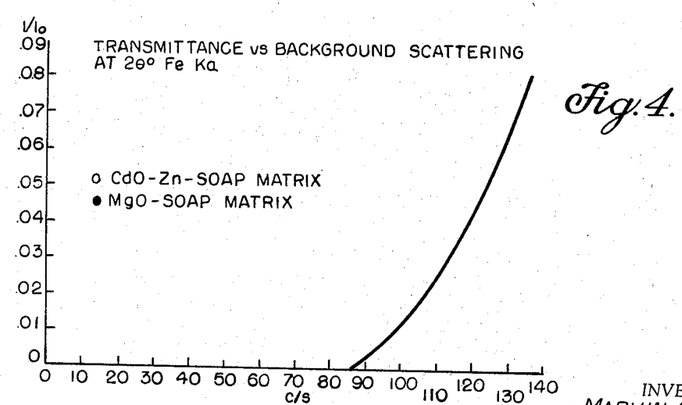
FIGURE 4 is a graphical representation of transmittance to background scattering at the FeK$\alpha$ wave length in non-ferrous samples.

The scattering-transmittance relation for two nonferrous matrices (CdO-Zn-O acetate and MgO) in 1 gram soap briquets is shown in Table V and FIGURE 4. Note that at equivalent transmittance, specimen weight percents differ but scattering is similar.

Note the improved sensitivity of zinc compared to iron due to the more energetic ZnKα radiation. Table IX summarizes the zinc data from the biologic specimens. Addition of Zn to two milk samples afforded an internal standardization check on the method, the results of which agreed well with the other determinations.

TABLE IX.—ZINC CONTENT OF BIOLOGIC MATERIALS

| Specimen | Specimen wt. in 1 g. briquet (mg.) | Net fluorescence, c./s. | Transmittance, $I/I_0$ | Sensitivity, c./s./ μg. Zn/briq. | Zn Conc., μg. Zn/g. spec. |
|---|---|---|---|---|---|
| Dog bone ash (F33) | 100.0 | 65 | 0.184 | 3.34 | 194.6 |
|  | 508.6 | 126 | 0.021 | 1.25 | 198.2 |
|  | 700.6 | 140 | 0.012 | 1.02 | 196.0 |
| Kibble food ash | 100.1 | 207 | 0.182 | 3.34 | 619.2 |
|  | 300.1 | 369 | 0.059 | 1.95 | 630.5 |
| Esbilac [1] ash | 200.0 | 178 | 0.089 | 2.25 | 396 |
| +353 μg. Zn | 300.0 | 221 | 0.050 | 1.70 | 433 |
| +646 μg. Zn | 300.0 | 795 | 0.046 | 1.65 | 429 |
|  | 298.0 | 1,279 | 0.046 | 1.65 | 433 |
|  | 499.9 | 248 | 0.019 | 1.15 | 431 |
| Dog hair ash | 400.1 | 12,608 | 0.045 | 1.60 | 19,695 |
|  | 500.6 | 13,148 | 0.029 | 1.34 | 19,600 |
|  | 600.8 | 13,650 | 0.020 | 1.14 | 19,930 |

[1] Borden Company.

Discussion

There are at least two conditions implied in the above method. There must be no apreciable enhancement effect, and the sample must not be X-ray opaque to the wavelength of interest (and thus prevent the transmittance determination). The problem of enhancement was discussed above, and it is believed to be minimal in light biologic matrices.

Figure 7:
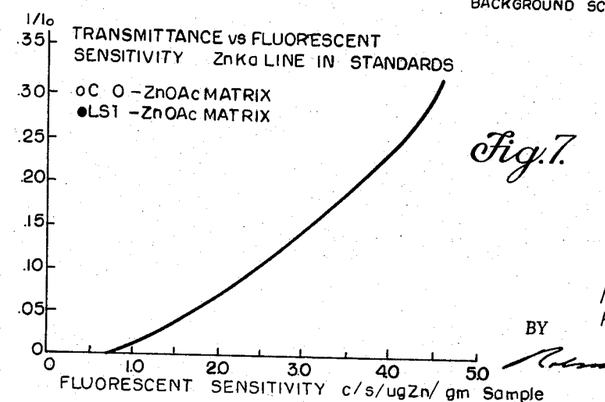
FIGURE 7 is a graphical representation of transmittance vs. fluorescent sensitivity of ZnK$\alpha$ line in standards.

As the data above indicate, transmittance becomes severely attenuated with long wavelengths. For example, a total of 2,048,000 counts were used for $I_0$ in the Fe transmittance determination. The 95% error interval on $I_0$ would be $2\sqrt{2 \times 10^6}$ or $\sim 3 \times 10^3$ counts. The transmitted count for the same time from a .3 g. limestone briquet was about $7 \times 10^3$ counts with an expected error $\sim$ of 40%. In order to improve (i.e. increase) transmittance, the weight fraction of specimen would have to be reduced, and consequently the iron net intensity count rate error would increase and impair precision. As seen in FIGURES 5 and 7 sensitivity and transmittance are not linearly related and maximal sensitivity is associated with the samples containing the smallest specimen fraction. For example the iron in kibble fod ash was found to be about 4.54 mg. Fe/g. ash (Table VII). The counting error associated with the 300 mg. specimen would be $2\sqrt{293}$ c./s. (0.50) or about 26.3 μg. Fe which is 1.9% of the iron content of the sample. However, the 100 mg. specimen counting error would be $2\sqrt{363}$ c./s. (0.81) or about 15.4 μg. Fe which is 6.8% of the iron content. In this case a factor of 3 reduction in specimen weight results in a factor of 3.5 increase in error for only a 62% increase in sensitivity. Thus optimal conditions would include a compromise between maximal net fluorescence per sample compatible with minimal transmittance determinations, which becomes more difficult as the characteristic wavelength increases. It was found that the one gram sample preparation above is not applicable to transmittance measurements on elements lighter than $Z=23$ (canadium); i.e. 0.126 g./cm.$^2$ soap briquets totally absorb energies less than about 4.9 kev. and $I/I_0$ approaches zero.

While what may be considered to be preferred embodiments of the invention have been described in the foregoing, modifications may be made therein without departing from the teachings and scope of the invention and is intended to cover all such as fall within the scope of the appended claims.

What is claimed is:
1. In an X-ray fluorimetric process for analyzing for the content of a particular element in a material of unknown complex matrix composition, the steps comprising;
    (a) directing a monochromatic beam of X-rays of a characteristic fluorescent wave length of said particular element and having an initial intensity, $I_0$, through a sample of said material having a standard mass/unit area;
    (b) subjecting a detecting and counting device to the X-ray beam subsequent to transmission through said sample to determine the residual intensity, I;
    (c) directing a polychromatic beam of X-rays to impinge on said sample to produce X-rays of said characteristic wave length of said particular element therefrom;
    (d) exposing a detecting and counting device to said characteristic wave length X-rays emitted from said sample to determine the intensity thereof indicative of the sensitivity's, of the sample;
    (e) determining the content of said particular element in said sample by correlating the value of the transmittance, T, coresponding to the ratio of $I/I_0$ and sensitivity value, S, obtained in the foregoing operations to a calibrated linear relationship of $I/I_0$ and S, derived using standard samples of known composition and of similar size and area.
2. The process as defined in claim 1 wherein said sample comprises a rigid uniform thickness wafer-like compact of standard weight and area containing said material of unknown complex matrix composition in finely-divided form dispersed in a binder of low Z effective atomic number.
3. The process as defined in claim 2 wherein said binder comprises an organic binder material.
4. The process as defined in claim 2, wherein said material of unknown complex matrix composition comprises a biologic material.
5. The process as defined in claim 1 wherein said element is an element having a characteristic fluorescent X-ray wave length equivalent to an energy in the range of about 10 to 150,000 kiloelectron volts.
6. The process as defined in claim 5 wherein said element comprises strontium.
7. The process as defined in claim 5 wherein said element comprises iron.
8. The process as defined in claim 5 wherein said element comprises zinc.
9. A process as defined in claim 1, wherein said monochromatic beam of X-rays directed through said sample comprises an X-ray beam produced by bombarding a rigid source containing said particular element with polychromatic X-rays of higher energy to produce characteristics fluorescent X-rays therefrom and by separating and collimating the characteristic monochromatic fluores- cent wave length emergent at the 2 θ Bragg angle from said source.

10. A process as defined in claim 1, wherein said calibrated linear relationship comprises a calibration graph of sensitivity, S, versus transmittance ratio, T, $I/I_0$ as similar standard samples of known particular element content.

References Cited
UNITED STATES PATENTS

| | | | |
|---|---|---|---|
| 2,837,655 | 6/1958 | Lang | 250—51.5 |
| 2,925,497 | 2/1960 | Bessen | 250—51.5 |
| 3,029,341 | 4/1962 | Keeling | 250—51.5 |

WILLIAM F. LINDQUIST, *Primary Examiner.*